Nov. 19, 1929.  J. H. THOMPSON  1,736,381
TEAPOT
Filed April 19, 1928

Inventor:
James Henry Thompson
By
Attorney.

Patented Nov. 19, 1929

1,736,381

UNITED STATES PATENT OFFICE

JAMES HENRY THOMPSON, OF EAST KEW, AUSTRALIA

TEAPOT

Application filed April 19, 1928, Serial No. 271,289, and in Australia November 14, 1927.

The prevent invention refers to vessels used for the infusion of tea, usually termed tea pots, and has been devised to provide a tea pot having the following principal practical advantages, viz:—

1. Effective infusion of the tea without disseminating the leaves into the liquid.

2. Prevention of dust particles passing out with the liquid.

3. Prevention of overdrawing by the easy removal of the leaves from the teapot when sufficient infusion has been effected.

According to the present invention, effective infusion is secured by placing the tea leaves in an infusion chamber detachably depending from and rotatable upon the vertical flange of the mouth of the tea pot. The infusion chamber is of circular form at the upper end and the body is gradually shaped as it proceeds downwardly to form a non-circular section and terminates in a closed bottom reaching nearly to the bottom of the tea pot. The wall of the chamber is finely perforated to within a short distance of a closed and dished bottom forming a trap for dust and small particles.

According to a further feature of the invention, any particles passing through the infusion chamber into the body of the tea pot are prevented as far as possible from passing out through the spout of the tea pot by extending the inner end of the spout into the body of the tea pot and covering the orifice at said end with a perforated screen projecting from the lower portion thereof.

The accompanying drawings feature a practical application of the invention.

In these drawings.

Figure 1:
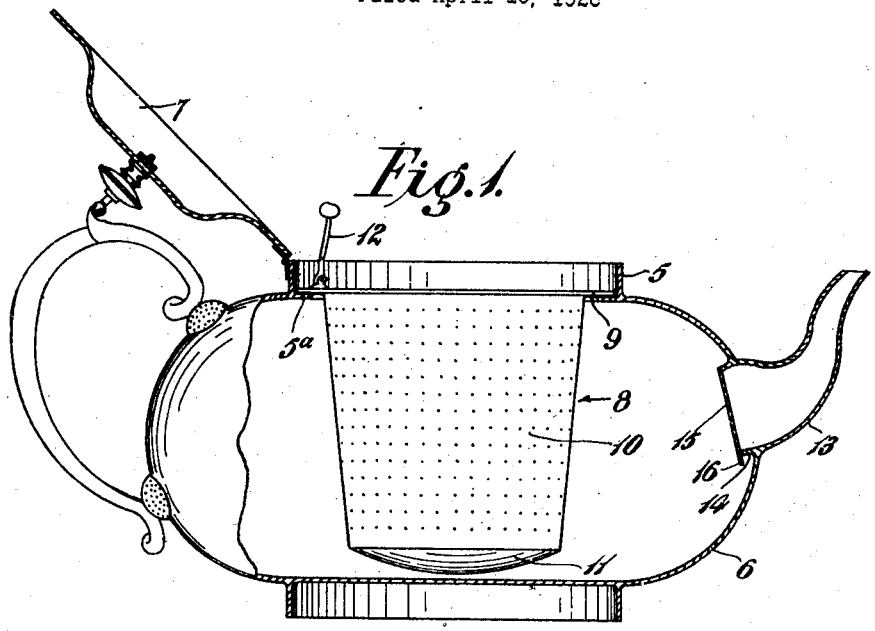
Figure 1 is a vertical section of a tea pot complete with the improvements according to this invention.
Figure 2:
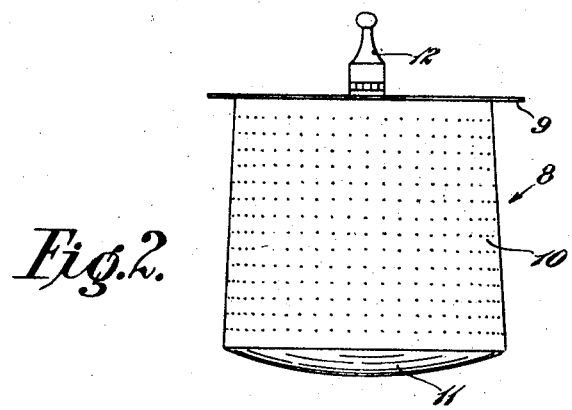
Figure 2 is an elevation at right angles to Figure 1 of the infusion chamber removed from the body of the tea pot.
Figure 3:
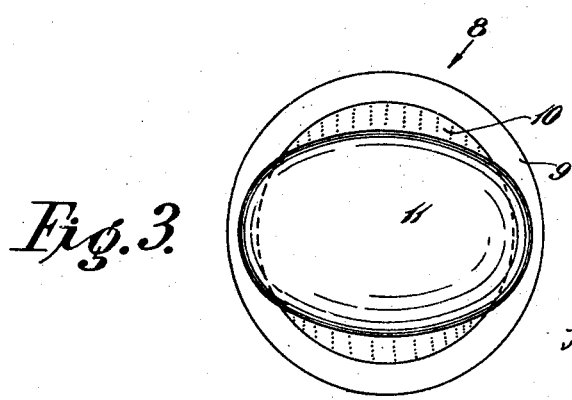
Figure 3 is an underneath plan of Figure 2.

The usual mouth flange 5 of the body 6 of the tea pot supports the hinged lid 7 in its closed position in the usual way.

When the infusion chamber 8 is inserted in the body of the tea pot it is supported by its circular flange 9 resting upon the flange 5ª.

Said chamber 8 is formed of a continuous wall 10 which is perforated for the passage of liquid therethrough. Said wall 10 at its upper end is circular and proceeding downwardly is gradually flattened to terminate in an approximately elliptical closed convex bottom 11 which forms a container for fine particles. Rotation is imparted to the chamber 8 by any suitable means as by the use of the handle 12 hinged to the flange 9, and the formation of the body of the infusion chamber as before described ensures the necessary agitation hereinafter referred to.

To further prevent the passage of any fine particles from the body 6 of the tea pot through the spout 13, the latter is provided with an inward projection 14 and the base of the spout is covered by a perforated screen 15, the lower edge 16 of which projects slightly beyond said orifice.

In use, the boiling water to be infused with tea may first be poured into the body 6 of the tea pot, and the infusion chamber 8 with fresh tea leaves therein is then inserted at once into the tea pot and rotated to ensure intimate contact of the water with the tea leaves by setting up a turbulent swirling of the water in the chamber which I have found by experiment is not effectively secured unless the chamber is made up in the above described form.

The usual period of time having elapsed for infusion according to desire, the infusion chamber 8 can be removed from the tea pot and so prevent overdrawing of the tea which is recognized as harmful.

Alternatively, the chamber 8 with the fresh tea leaves therein may first be inserted in the tea pot and the boiling water then poured through the chamber.

The tea ready for use is in a clear condition except for any small particles which may have been washed through the perforations in the infusion chamber 8, and these particles will be restrained from passage to the spout 13 by the protective screen 15 and caught under the lower portion thereof.

I claim:—

1. In tea pots, an infusion chamber having a circular flange at the upper end and being rotatably and detachably dependent from the mouth flange of the tea pot, said chamber having a finely perforated wall and proceeding downwardly with a gradual variation of the form to a non-circular section, with a closed bottom at the lower end of the chamber.

2. In tea pots, an infusion chamber having a circular flange at the upper end and being rotatably and detachably dependent from the mouth flange of the tea pot, said chamber having a finely perforated wall and proceeding downwardly from said flange with gradual flattened progression to terminate in a closed bottom of approximately elliptical form.

3. In tea pots, in combination, an infusion chamber having a finely perforated wall, a circular flange at the upper end of the chamber, a handle attached to said flange, and a closed approximately elliptical bottom to said chamber, the said wall of the chamber being gradually flattened from its upper to its lower end.

4. In tea pots, in combination, an infusion chamber having a finely perforated wall, a circular flange to which the upper end of the chamber is attached, a handle hingedly attached to said flange, and an approximately elliptical closed bottom for said chamber, the said wall of the chamber being gradually flattened from its upper to its lower end.

In witness whereof I have signed this specification.

J. H. THOMPSON.